United States Patent [19]
Kroeckel et al.

[11] Patent Number: 5,370,229
[45] Date of Patent: Dec. 6, 1994

[54] HIGH IMPACT RESISTANT PACKAGING SYSTEM AND METHOD

[75] Inventors: Ronald W. Kroeckel, Webster; Allen B. Cullen, Churchville; James E. Burns, Rochester, all of N.Y.

[73] Assignee: Eastman Kodak Company, Rochester, N.Y.

[21] Appl. No.: 100,885

[22] Filed: Aug. 2, 1993

[51] Int. Cl.$^5$ ............................................. B65D 81/06
[52] U.S. Cl. ................................ 206/523; 206/497; 206/586
[58] Field of Search ............... 53/397, 399, 441, 442, 53/449; 206/45.33, 497, 521, 523, 586, 591, 597

[56] References Cited

U.S. PATENT DOCUMENTS

| | | | |
|---|---|---|---|
| 1,998,515 | 4/1935 | Miller | 266/62 |
| 2,885,139 | 5/1959 | Werner et al. | |
| 3,362,617 | 1/1968 | Gieber | 383/205 |
| 3,695,421 | 10/1972 | Wood | |
| 3,809,311 | 5/1974 | Fohrman et al. | |
| 3,939,978 | 2/1976 | Thomaswick | 206/454 |
| 4,202,449 | 5/1980 | Bendt | 206/597 |
| 4,403,695 | 9/1983 | Raymoure et al. | 206/45.33 |
| 4,484,681 | 11/1984 | Consiglio, Jr. | 206/499 |
| 4,610,355 | 9/1986 | Maurer | 206/386 |
| 4,793,490 | 12/1988 | Evert | 206/497 |
| 4,838,427 | 6/1989 | Hurley | 206/586 |
| 4,883,179 | 11/1989 | Dionne | 206/523 |
| 4,895,255 | 1/1990 | Fisher | 206/497 |
| 4,977,137 | 10/1989 | Govang et al. | 206/597 |
| 5,131,541 | 7/1992 | Liebel | 206/586 |
| 5,154,297 | 10/1992 | Farley | 206/586 |
| 5,175,041 | 12/1992 | Webb et al. | 428/116 |
| 5,251,753 | 10/1993 | Pigott et al. | 206/597 |

FOREIGN PATENT DOCUMENTS 1224493  3/1968  United Kingdom .

Primary Examiner—Jimmy G. Foster
Attorney, Agent, or Firm—Clyde E. Bailey

[57] ABSTRACT

A high impact resistant package system 10 for a container of fragile products, such as X-ray cassettes, has a plurality of shock absorbing polyethylene plastic foam corner protector members 12 mounted on corner edges 14,16,20,22 of the container. Alternatively, a flexible material layer 50 overwraps the product container 18 and corner protector members 12, thereby forming a unitized package system. Portions of the corner protector members 12 extend beyond the corner edges 14,16,20,22 and sides of the container so as to fully absorb exposure to shock during handling and shipment. In an alternative embodiment, the flexible layer 50 is provided with a peelable strip 40. An end portion 42 of the strip 40 is allowed to extend through an aperture 44 formed in the flexible layer 50. In this embodiment, access to the container is gained by grasping the end portion 42 of strip 40 and pulling it away from the container 18.

8 Claims, 6 Drawing Sheets

HIGH IMPACT RESISTANT PACKAGING SYSTEM AND METHOD

FIELD OF THE INVENTION

The invention relates in general to packaging. More particularly, the invention concerns a packaging system that provides improved high impact resistance for containers of fragile products, such as photoactive products, during shipment and handling.

BACKGROUND OF THE INVENTION

Many manufactured goods, particularly containers that hold fragile products, such as photoactive products, resemble box-like configurations and often have attractive finishes on the exterior surfaces. In order to protect these products from damage, manufacturers often package these products in boxes made from corrugated paperboard. Typically containers of photoactive products, such as X-ray cassettes, are shrink wrapped for dust protection and then placed in a corrugated folder for damage protection during handling and shipment. The folder 1 (FIGS. 1 & 2) generally comprises overlapping or rolled up portions 2 along opposing sides 3,4 of the product 5. These overlapping corrugated portions are known to be bulky, cumbersome to handle, add excessive weight to the product, and generate excessive waste for the environmental waste stream.

Conventional packaging for containers of fragile products requires bulky materials for adequate packaging. Such packaging schemes are typically not fully recyclable and, therefore, they contribute to the environmental waste stream. Another problem with current packaging is that it is expensive to manufacture because of the excessive packaging material requirements. To protect containers of fragile products, such as photoactive products, from sustaining damage which might otherwise occur when the product container experiences impacts of sufficient magnitude to deform it or perhaps even cause a slight penetration, manufacturers have typically used corrugated paperboard as described previously.

While edge support members have not been used to protect containers of photoactive products, like X-ray cassettes, corner protectors of some sort are known in other types of products for meeting various packaging needs.

U.S. Pat. No. 5,175,041 to Webb et al. is directed to a corner protector formed from paper honeycomb material which fits between the corner of a container and the corner of a relatively rigid object in the container. A shortcoming of the Webb device is that it requires a rigid container in addition to the product container without which the honeycombed corner protector could not be mounted.

U.S. Pat. No. 3,939,978 to Thomaswick discloses a shipping container having polyethylene corner pads surrounded by corrugated board. Thomaswick requires corrugated sheet material that adds weight and additional waste.

Therefore, there persists a need for an easily manufacturable, fully recyclable, easily stored, economical package for product containers of photoactive materials that provides high impact resistance protection during shipping and handling.

SUMMARY OF THE INVENTION

It is, therefore, the object of the invention to overcome the shortcomings of the prior art. Accordingly, for accomplishing these and other objects of the invention, there is provided, in one aspect of the invention, a package system for a straight sided with polygonal corner edges container comprises a corner protector member removably mounted on at least opposing corner edges and at least one corner edge adjacent an opposed corner edge. In an alternative embodiment, a flexible material layer is overwrapped (preferably heat shrinked) around the product container and corner protector men, pets. The corner protector members extend beyond the corner edges and first and second opposite sides of the product container for protecting the product from damage during shipping and handling.

In another aspect of the invention, a method for providing high impact resistance packaging for a product container of photoactive material comprises providing the corner protector men, pets, described above, and removably mounting the corner protector members on the end edges of the product container. The product container with corner protector members mounted on the corner edges is then overwrapped with a flexible material layer.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE INVENTION

Figure 1:
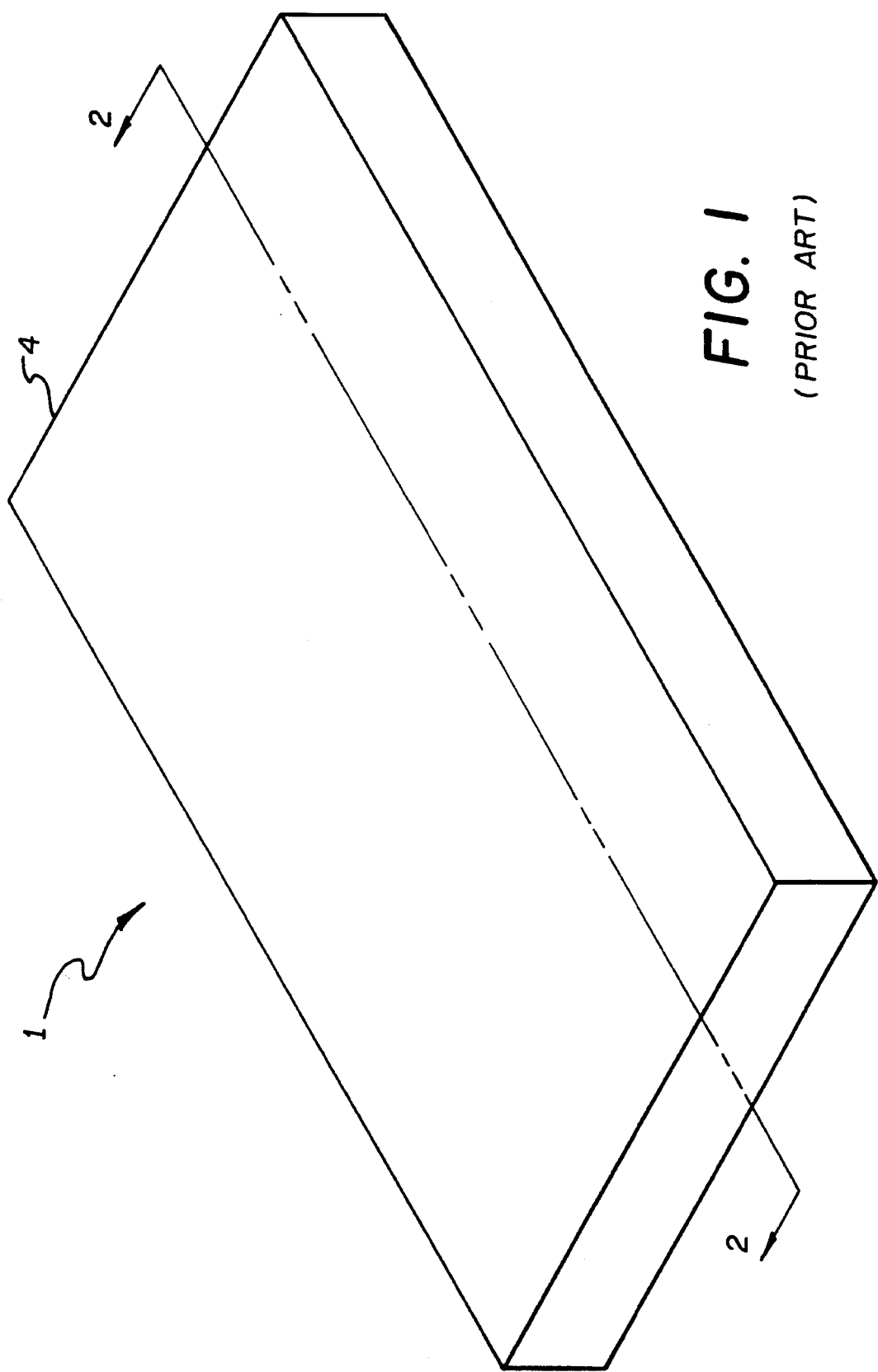
FIG. 1 is a perspective view of a prior art package for containers of photoactive products.
Figure 2:
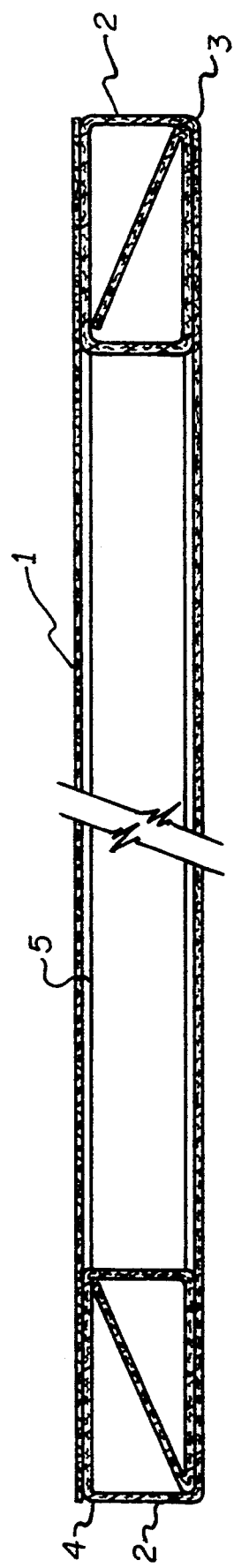
FIG. 2 is a section view along 2—2 of FIG. 1.
Figure 3:
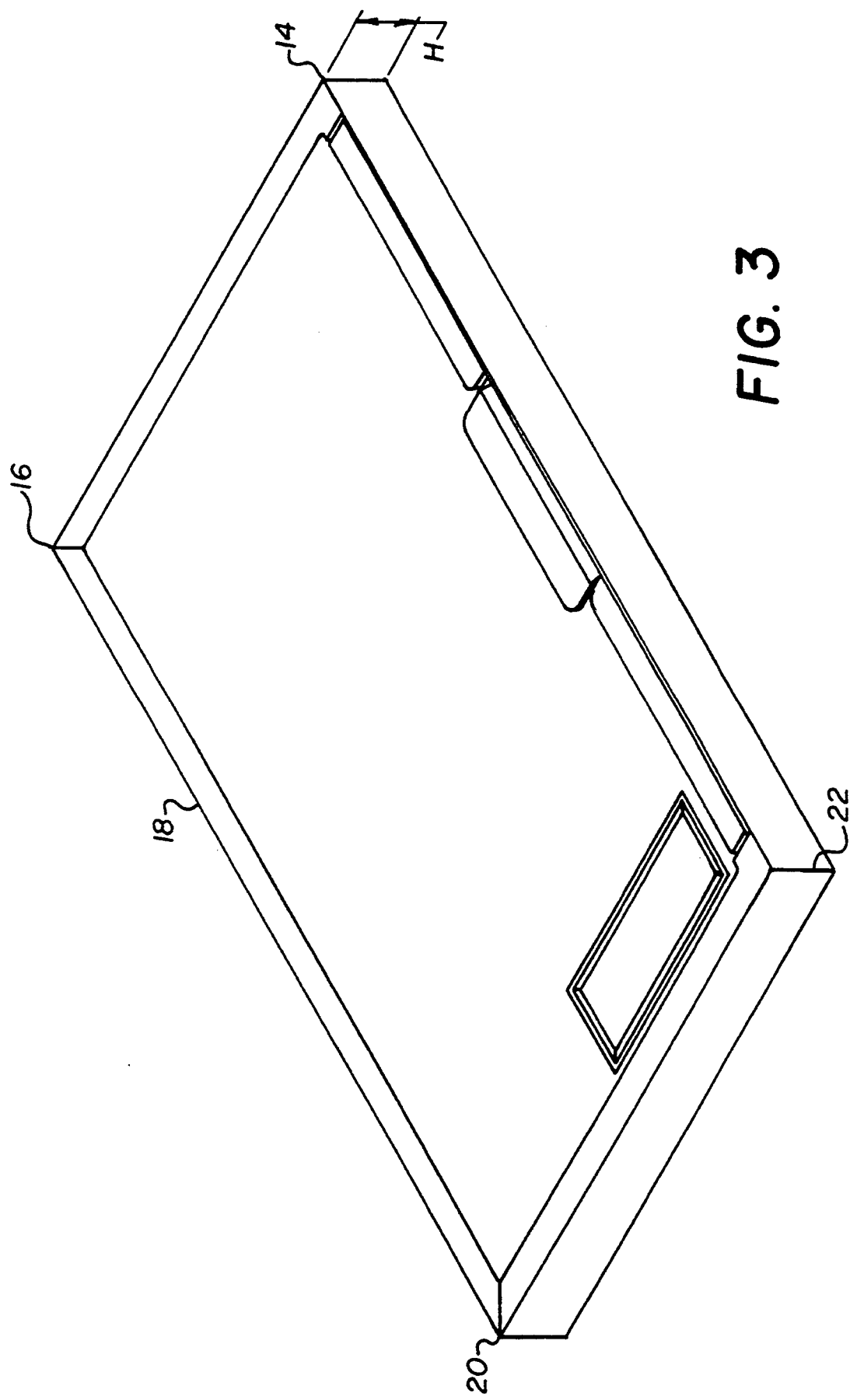
FIG. 3 is a perspective view of a product container.

FIG. 3 shows a typical product container 18 for holding a fragile material, like a X-ray cassette, that requires protection from high impact damage, such as shock resulting from handling and shipment. Generally, these product containers 18 are a rigid, generally box-like structure having a plurality of corner edges 14,16,20,22 (FIG. 3). While there are a range of product containers 18, having a variety of shapes and sizes, which may be packaged in the packaging system 10 of the invention, the packaging system 10 of the invention is preferably used with substantially rectangular shaped product containers 18. Moreover, the corner edges 14,16,20,22 may have a variety of shapes, although product containers 18 having substantially flat polyhedral shaped corner edges 14,16,20,22 are best suited for the packaging system 10 of the invention.

Figure 4:
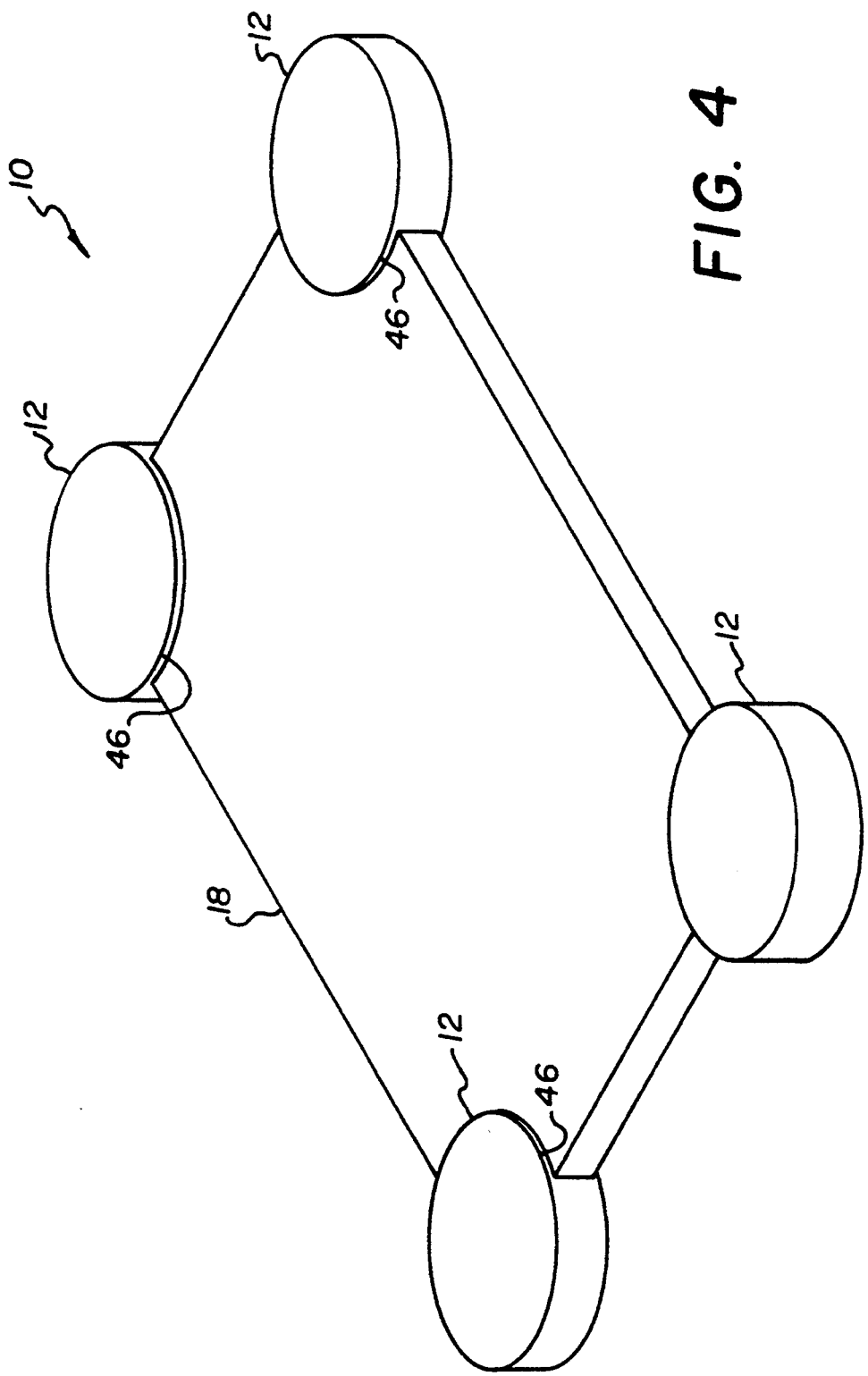
FIG. 4 is a perspective view of product container having support members mounted thereon.
Figure 5:
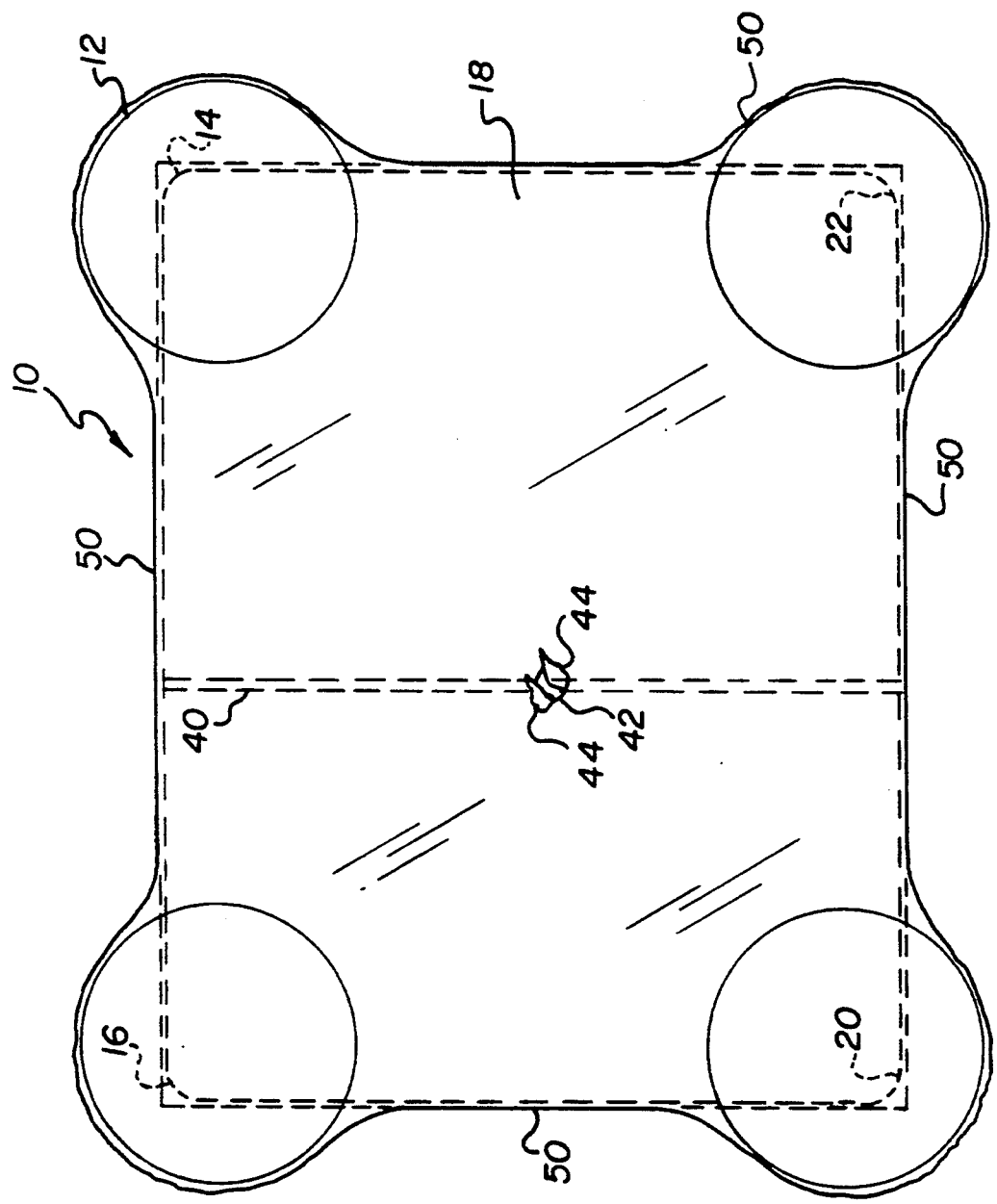
FIG. 5 is a top plan view of the protective packaging of the invention.

Turning to FIGS. 4 & 5, the high impact resistant packaging 10 of the invention comprises corner protector member 12 mounted on at least diagonally opposing corner edges 16,22 of the product container 18 and one corner protector member 12 mounted on a corner edge 14 or 20 adjacent one of the opposing end edges 14,16.

Corner protector members 12 may be made of a pliable material such as rubber, cork, or polyethylene. In the preferred embodiment, corner protector members 12 are made from Ethafoam ®, a polyethylene plastic foam material made by the Dow Chemical Company, Midland, Mich.

Figure 6:
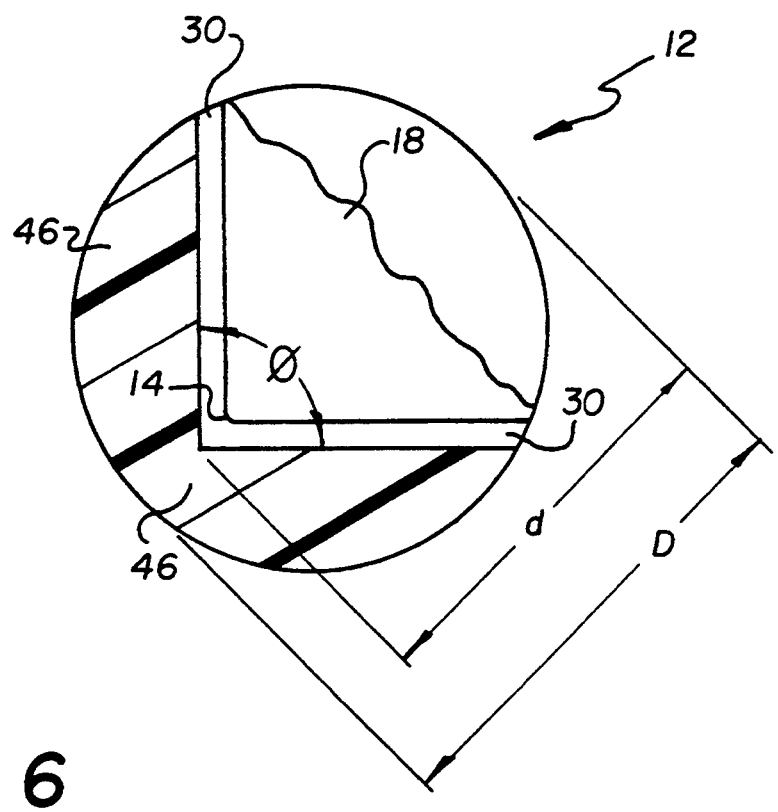
FIG. 6 is a top view of a corner protector member sectioned to expose a corner edge of the product container lodged therein; and, FIG. 7 is a side view of the corner protector member illustrating the slot.
Figure 7:
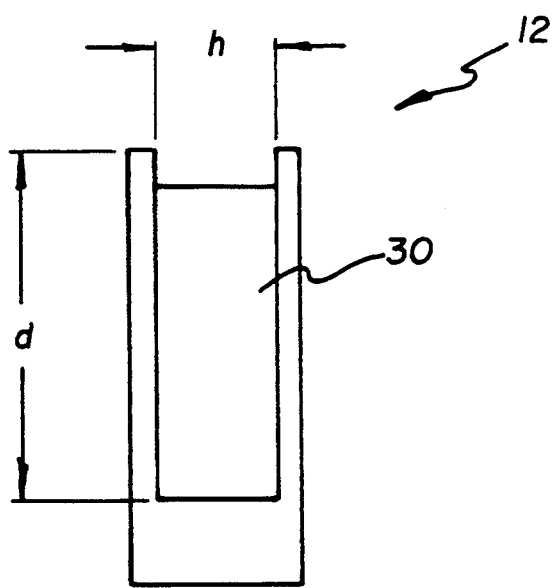

FIG. 6 shows corner protector member partially sectioned through a periphery portion 28 to form a slot 30 having a polyhedral angle $\phi$. Also illustrated in FIG. 6 is corner edge 14 only partially lodged in the slot 30, described in details below. While the corner protector members 12 could be just about any shape, such as cylindrical or triangular, a substantially circular shaped corner protector member 12 having a diameter (D) is preferred. Moreover, the polyhedral angle $\phi$ formed in the slot may be less than or equal to 180°. In the case of a product container 18 for a fragile product, like a X-ray cassette (FIG. 3), a corner protector member 12 having a diameter of about 3 inches (7.62 cm) and slot having a polyhedral angle $\phi=90°$ is preferred. Slot 30 fits around an corner edge 14,16,20,22 of the product container 18, as described below. Preferably, slot 30 has a height (h) equal to or somewhat larger than the height (H) of the corner edge 14,16,20,22 (FIG. 7). Therefore, corner protector member 12 may either be frictionally fitted onto corner edge 14,16,20,22 or loosely fitted onto corner edges 14,16,20,22. Alternatively, those skilled in the art will appreciate that corner protector members 12 may be mounted to corner edges 14,16,20,22 by an interference fit, i.e., where the height (h) of the slot 30 is slightly less than the height (H) of the corner edges 14,16,20,22 of the product container 18. Preferably corner protector members 12 are generally freely mounted on corner edges 14,16,20,22, i.e., where the slots 30 each has a height (h) somewhat greater than the height (H) of the corner edge 14,16,20,22 of the product container 18. A preferred height (h) of the slot is 0.4375 inch (1.11125 cm). Moreover, according to FIG. 6, slot 30 has a depth (d) slightly greater than the radius (R) of the corner protector member 12 (diameter "D" is shown) which enables a portion 46 of the corner protector member 12 to extend beyond the corner edges 14,16,20,22 of the product container 18. For a product container 18, such as a X-ray cassette (FIG. 3), a preferred depth (d) for slot 30 is about 2 inches (5.04 cm). Of course, the dimensions of the product container 18 governs the preferred depth (d) for slot 30. Although according to FIGS. 4 & 6, portions 46 may extend outwardly from respective corner edge 14,16,20, or 22 by any amount, it is preferable that portions 46 extend an equal distance away from respective corner edge 14,16,20,22. This ensures a fairly equal distribution of forces on the product container 18 when it is exposed to shock, such as when the product container 18 is dropped.

Skilled artisans could alternatively form corner protector members 12 in the flexible material layer and then, in one step, overwrap the product container 18. In this embodiment, care must be taken to ensure that the support members 12 line up with the corner edges of the product container 18 during assembly of the high impact resistant packaging 10.

In an alternative embodiment, a flexible material layer 50, such as a shrink wrap, overwraps the product container 18 and corner protector members 12 mounted thereon forming a unitized package 10.

In the preferred embodiment, the flexible material layer 50 is CLYSAR ® Shrink film made by Du Pont Packaging CO., 1007 Market Street, Wilmington, Del. Alternatively, flexible material layer 50 may comprise a polyolefin film material, such as an extruded plastic film, or a paper material or a polypropylene bag.

The process for assembling and using the package 10 of the invention includes providing the product container 18 to be packaged, as described above. The corner protector members 12, as described above, are then mounted on the corner edges 14,16,20,22 of the product container 18 as shown in FIGS. 3 & 4. Corner protector members 12 may be mounted manually by hand or they may be installed by automated equipment. In either case, it is important to the invention that the slots 30 have the general characteristics as described above so that the corner protector members 12 can be mounted onto the corner edges 14,16,20,22 of the product container 18 for absorbing maximum shock.

After the corner protector members 12 are fully mounted onto the corner edges 14,16,20,22 of the product container 18, the flexible web layer 50 is then shrinked wrapped fully around the product container 18 including corner protector members 12. Conventional shrink wrap equipment is preferably used for this process, although those skilled in the art can appreciate that other methods of wrapping flexible layer 50 around the product container may also be used.

In an alternative embodiment, according to FIG. 5, before the product container 18 is shrink wrapped, a peelable strip 40 may be bonded to the underside of the shrink wrap layer 50 (i.e., the side directly interfacing the product container 18) to provide a convenient means for accessing the container. In this embodiment, an aperture 42 is made in the flexible layer 50 collinear with the peelable strip 40 and an end portion 44 of the strip 40 is exposed through the aperture 42. Once the package 10 is fully assembled, the user can gain easy access to the product container 18 by simply grasping and pulling the extended end portion 44 away from the product container 18. Preferably, the product container 18 may be accessed by simply initiating a tear in any portion of the shrink wrap layer 50.

Accordingly, an important advantage of the present invention is that it provides an economical, easy to manufacture, fully recyclable, easily stored, improved high impact resistant packaging during shipping and handling.

While the invention has been described with a certain degree of particularity it is manifest that many changes may be made in the details of construction and the arrangement of components without departing from the spirit and scope of this disclosure. It is understood the that the invention is not limited to the embodiments set forth herein for purposes of exemplification, but is to be limited only by the scope of the attached claim or claims, including the full range of equivalency to which each element thereof is entitled.

We claim:

1. A package system for a product container enclosing photoactive material, said product container having straight sides with polygonal ends, first and second opposite sides and at least three opposing corner edges, the package system comprising:

at least three substantially disk-shaped corner protector members, said corner protector members being removably mounted to said opposing corner edges and one additional corner protector member being removably mounted to an adjacent one of said opposing corner edges, said corner protector members extending beyond said respective corner edge and overlapping at least a portion of said first and second opposite sides of said product container for providing a protective cushion for the product container; and, wherein a flaccid material layer fully surrounds said product container and said corner protectors mounted thereon.

2. The package recited in claim 1 wherein said corner protector members are made of a pliable material.

3. The package recited in claim 2 wherein said pliable material is a polyethylene foam.

4. The package recited in claim 1 wherein said corner protector members each is provided with a slot portion having a height (h) equal to or somewhat larger than the height (H) of the end edge of the container for mounting onto said corner edge.

5. The package recited in claim 1 wherein said flaccid material layer is provided with a peelable strip bonded thereto, said peelable strip having an relieved end portion for graspably pulling a portion of the flexible material away from the product container thereby providing access to the product container.

6. An article of manufacture, comprising:
a product container enclosing a photoactive material, said product container having substantially straight sides with polygonal ends, first and second opposite sides and at least three corner edges;
a corner protector member removably mounted on the corner edges of the product container, said corner protector member overlapping at least a portion of said first and second opposite sides of said product container; and,
a flaccid material layer fully overwrapped around said product container and said corner protector members.

7. A package for a product container enclosing photoactive material, said product container having straight sides with polygonal ends, first and second opposite sides and at least three corner edges, said package made by the process comprising the steps of:
providing a flaccid material layer;
providing at least three corner protector members each being removably mountable onto one of said corner edges, said corner protector members when mounted on said corner edges being configured to overlap at least a portion of said first and second opposite sides of said product container for providing cushioning against shock;
mounting said corner protector members onto opposite corner edges and one additional corner protector men%her onto a corner edge adjacent an opposite corner edge; and,
fully overwrapping said flaccid material layer around said product container and said corner protectors mounted thereon.

8. The package recited in claim 7 wherein the process further comprises the step of providing a peelable strip bonded to said flaccid material layer, said peelable strip having a relieved end portion for graspably pulling a portion of the flaccid material away from the product container thereby providing access to the product container.

* * * * *